United States Patent [19]
Bomke
[11] 3,936,748
[45] Feb. 3, 1976

[54] SECRET COMMUNICATION SYSTEM EMPLOYING MAGNETIC CONTROL OF SIGNAL MODULATION ON MICROWAVE OR OTHER ELECTROMAGNETIC CARRIER WAVE

[75] Inventor: Hans A. Bomke, Sea Girt, N.J.
[73] Assignee: The United States of America as represented by the Secretary of the Army, Washington, D.C.

[22] Filed: Sept. 10, 1956
[21] Appl. No.: 610,445

[52] U.S. Cl. .................. 325/32; 250/199; 325/105; 350/151
[51] Int. Cl.² ........................ H04K 1/00; H04B 9/00
[58] Field of Search .............. 325/32, 105; 250/199; 350/151

[56] References Cited

UNITED STATES PATENTS 2,531,951 11/1950 Shamas et al. .......................... 250/7

OTHER PUBLICATIONS

The Bell System Technical Journal Vol. 31 No. 1 Jan. 1952, pp. 1–31.

*Primary Examiner*—T. H. Tubbesing
*Assistant Examiner*—S. C. Buczinski
*Attorney, Agent, or Firm*—Nathan Edelberg; Robert P. Gibson; Jeremiah G. Murray

EXEMPLARY CLAIM

1. A system for transmitting varying amplitude signals with a high degree of secrecy over a wave transmission medium, including a source of polarized electromagnetic waves of predetermined wavelength at the input to said medium, three transmission devices each adapted for transmitting electromagnetic waves in a given direction, and including a substance having a resonance spectrum with a strong, sharp absorption line therein including said predetermined wavelength within its frequency limits, and exhibiting strong anomalous dispersion in the immediate neighborhood of said line, a first and a second one of said devices being located at the input to said medium and the third being located at the output of said medium, means to apply an electromagnetic wave from said source to said first device in said given direction, means simultaneously to apply to said first device in the direction of wave propagation a weak magnetic field varying in accordance with the amplitude of the signals to be transmitted, in order to produce rotation effects in the applied wave proportional to the instantaneous signal amplitudes, representing signal modulation, means to apply the resulting modulated wave to the second of said devices in said given direction, means simultaneously to apply to said second device in the direction of wave propagation a strong magnetic field of such strength as effectively to cause the removal from the modulated wave in transmission through that device of the rotation effects representing signal modulation, and thus to render the signals carried by that wave secret to a high degree before the wave is transmitted over said medium, means at the output of said medium to apply the received wave to said third device in said given direction, means simultaneously to apply to said third device in the direction of wave propagation a strong magnetic field of the same strength as that applied to said second device but reversed in direction with respect thereto to reinsert effectively in the applied wave in transmission through said third device the rotation effects representing signal modulation removed by said second device, means to convert the rotation effects in the resulting wave into proportional amplitude modulation and means to detect the signals from the resulting amplitude modulated wave.

10 Claims, 18 Drawing Figures

Figure 1:
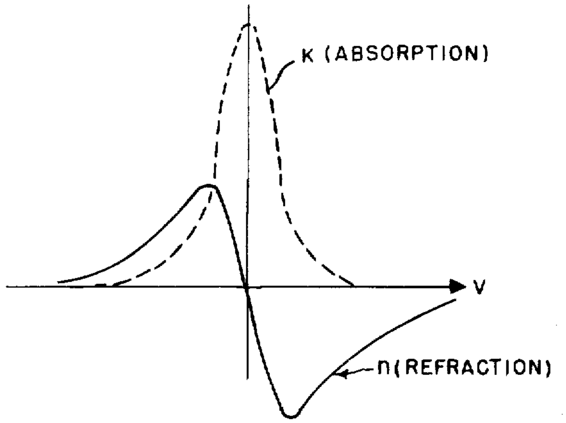

INVENTOR.
HANS A. BOMKE

BY

Harry M. Saragovitz

ATTORNEY

*INVENTOR.*
HANS A. BOMKE

*BY*

Harry M. Saragovitz
ATTORNEY

INVENTOR.
HANS A. BOMKE

BY

Harry M. Saragovitz
ATTORNEY

INVENTOR.
HANS A. BOMKE
BY
Harry M. Saragovitz
ATTORNEY

SECRET COMMUNICATION SYSTEM EMPLOYING MAGNETIC CONTROL OF SIGNAL MODULATION ON MICROWAVE OR OTHER ELECTROMAGNETIC CARRIER WAVE

The invention described herein may be manufactured and used by or for the Government for governmental purposes, without the payment of any royalty thereon.

The invention relates to signaling and communication systems and particularly to secret signaling and communication systems.

A general object of the invention is to improve such secret signaling and communication systems from the standpoint of efficiency and economy.

Another object is to provide a high degree of secrecy in the transmission of speech or other intelligible signals as modulations on an electromagnetic carrier wave with simple and economical apparatus.

More specific objects are to provide modulation of speech or other intelligible signals on a microwave or other electromagnetic carrier wave; and to scramble and unscramble the signal modulation on such a wave so as to enable transmission of such signals over a wave transmission medium with a high degree of secrecy.

The basic phenomenon utilized in the secrecy systems of the invention is the so-called Faraday effect discovered by Michael Faraday in 1845. The effect, which as first presented had reference to light waves only, is a rotation of the plane of polarization of a linear (plane) polarized light wave produced when it is transmitted through a transparent substance, such as a glass block, when that substance is subjected to a magnetic field in the direction of propagation of the light wave. Subsequent to Faraday's discovery the same phenomenon was observed in many solids, liquids and gases. More recently it has been found that an effect analogous to the Faraday effect exists for electromagnetic waves other than polarized light waves; for example, it has been found that certain substances are adapted to rotate microwave energy transmitted through them to a greater or less extent when they are subjected to a suitable magnetic field. The amount of rotation in each case may be computed from the expression $$\phi=RHL \qquad (1)$$

where $\phi$ is the angle of rotation, $H$ is the magnetic field strength, $L$ is the length of the wave path through the substance and $R$ is a constant, commonly referred to as the "Verdet Constant," which depends on the material in the particular substance used and also on the wavelength of the electromagnetic wave.

The angle of rotation of the plane of polarization of a linear polarized light beam in most transparent substances is, in general, quite small, being in the order to 1° to 5° only for an applied magnetic field of 10,000 gauss and a light pass length in the transparent substance of 10 centimeters. Since such small effects are practically useless, particularly for the purposes of this invention, applicant experimented with many materials and conditions of their use in an attempt to produce the desired increase in the Faraday effect. It was found that materials having an atomic resonance spectrum including one or more strong, sharp absorption lines at particular wavelengths where suitable for this use, for example, monatomic gases, such as the vapors of mercury, cesium and the alkaline metals, sodium, potassium, etc., under sufficiently low pressure. Because of the long known, strong anomalous dispersion in such materials, the Faraday effect is anomalously high but only for wavelengths within the frequency limits of these sharp lines. In fact, it was found that at frequencies only a few tenths of an Angstrom away from a strong absorption line in such a substance, a magnetic field of more than 10,000 gauss is required to produce a hardly noticeable rotation of some arc minutes of the plane of polarization of a light beam transmitted through it, while within the frquency limits of the same absorption line the amount of Faraday rotation in response to relatively low applied magnetic fields is quite large. For example, tests with a Faraday cell consisting of a glass tube 12 centimeters long, filled with sodium vapor at $2 \times 10^{-3}$ millimeters pressure showed that for frequencies within the frequency limits of a strong absorption line in its spectrum the cell was sensitive to magnetic fields down to 1/10,000 of a gauss. The experiments indicated further that by proper adjustment of the experimental conditions the sensitivity of Faraday cells employing such gaseous materials could be easily increased by a factor of more than a million. To obtain such sensitivity, it is important that the gas in the cell be under an optimum low pressure or otherwise the effect of the anomalous dispersion is nullified to a certain extent by the radiation damping produced by the collision of the gas atoms with each other.

Applicant's experiments with the above referred to sodium vapor-filled Faraday cell and a linear polarized light beam provided by linearly polarizing the light rays from a commercial sodium lamp, for the associated light source, showed that satisfactory speech modulation of the polarized sodium light beam could be obtained by applying thereto a very weak speech modulating magnetic field, say of some few tenths of a gauss, to variably rotate the plane of polarization of the beam in accordance with the varying amplitude of the speech signals. In further experiments, the speech-modulated linear polarized sodium light beam so obtained was passed through an identical sodium vapor-filled Faraday cell subjected to a very strong magnetic field, instead of a very weak one such as used for the modulation purpose, and a new and entirely unexpected result was obtained. Instead of the expected further rotation of the plane of polarization of this light beam, it was found that when the applied magnetic field was sufficiently strong, the originally linear polarized light beam was effectively converted into completely unpolarized light. For the sodium vapor-filled Faraday cell, this happened when the applied magnetic field was increased to approximately 150 gauss. When the unpolarized light beam so obtained was transmitted through another Faraday cell identical with that used for producing that beam and was subjected therein to a strong magnetic field of the same magnitude as that previously used but with its direction reversed, a wave substantially like the original speech modulated linear polarized light beam was produced. These phenomena form the basis for the secret signaling and communication systems of the invention to be described briefly below.

In a broad sense, the invention resides in systems for transmitting speech or other signal intelligence as modulations of an electromagnetic carrier wave over a wave transmission medium with a high degree of secrecy by application of the above-described, newly discovered principles or variations of the Faraday effect to provide scrambling of the signal modulation on the carrier wave at the transmitting end of the medium and unscrambling of the signal modulation on the carrier wave at the receiving end of the medium in a very efficient way. More specifically, in these systems the scrambling and unscrambling of the signal modulation is obtained by the use of identical Faraday cells each comprising a substance in gaseous, liquid or solid form, adapted to allow passage therethrough of the electromagnetic wave used in a predetermined direction, having a resonance spectrum, for example, an atomic frequency resonance spectrum, including a strong, sharp resonance absorption line at the wavelength of that electromagnetic wave, and exhibiting high anomalous dispersion for frequencies within the immediate neighborhood of that line; and the application to each cell of a sufficiently strong magnetic field which is of the same magnitude for each cell but which is reversed in direction for the scrambling and unscrambling cells. The modulating means utilized in such a system may be a similar Faraday cell subjected to a very weak modulating magnetic field.

Suitable Faraday cells for the scrambler, unscrambler and modulating device for use in a secret optical communication system in accordance with the invention may comprise, for example, a tube of glass, quartz or other transparent material of optimum length containing at a sufficiently low pressure, in the order of a thousandth of a millimeter, a monatomic gaseous material, for example, the vapor of mercury, cesium, or one of the alkaline metals, sodium, potassium, etc., in which case the associated light source may comprise a linear polarized beam of light obtained from a lamp containing the same gaseous material at approximately the same low pressure, or one adapted for emitting most of its light as a single, sharp spectral line at a wavelength included within the frequency limits of a strong, sharp resonance absorption line of the gaseous material used in the Faraday cell.

Suitable cells analogous in principle of operation to Faraday cells, for the scrambler and unscrambler devices employed in a secret microwave communication system in accordance with the invention may comprise a suitable container adapted for transmitting the microwave used as the carrier wave in a predetermined direction, and containing a suitable paramagnetic substance having the desired resonance spectrum-anomalous dispersion characteristics. For example, each of these cells may comprise a suitable glass or quartz tube of optimum length containing a solution of finely divided particles of one of the alkaline metals, such as sodium, potassium, lithium, etc., in liquid ammonia, to each of which cells would be applied a very strong magnetic field, of the same magnitude (in the order of 2000 gauss) but of opposite direction for the scrambler and unscrambler devices. The substance analogous in its action to a Faraday cell used in this sytem for producing modulation of the microwaves transmitted therethrough with speech or other intelligible signals by the application of a very weak d-c magnetic field to cause variations in rotation of this wave in accordance with the amplitude of these signals, may be any one of a number of known materials adapted for this purpose, for example, a block of the material commonly referred to as "ferrite" which, as is well known, has the property of being able to rotate a microwave passed through it.

Although each of the secrecy systems of the invention as described above will provide an extremely high degree of secrecy in the speech or other intelligible signals transmitted over the wave transmission medium, in accordance with the invention the degree of secrecy may be further increased by providing the system with one or more additional, independently chooseable parameters. The additional parameters may be obtained, for exammple, by superimposing a sinusoidal alternating currrent on the d-c current in the scrambler coil, the frequency, amplitude and phase of which superimposed alternating current can be chosen at will, and by superimposing an a-c current of the same frequency, amplitude and phase on the d-c current in the unscrambler coil. Instead of using one sinusoidal alternating current a mixture of many sinusoidal alternating currents of different frequencies, amplitudes and phase may be used for obtaining more parameters.

Figure 6:
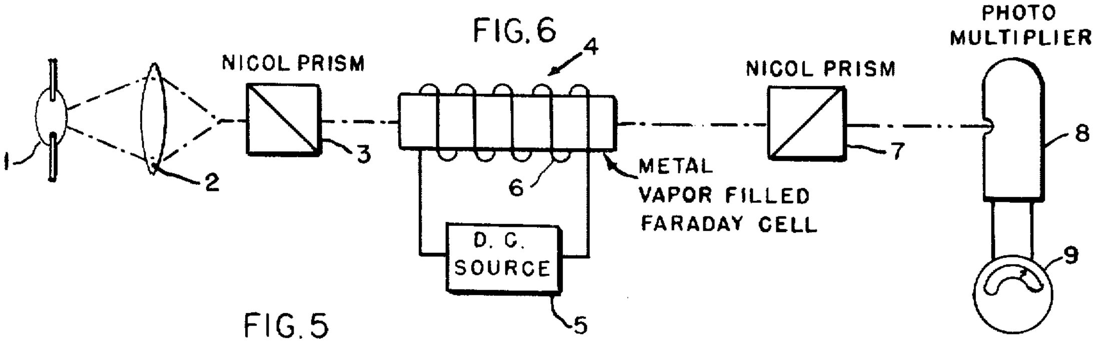
Figure 13:
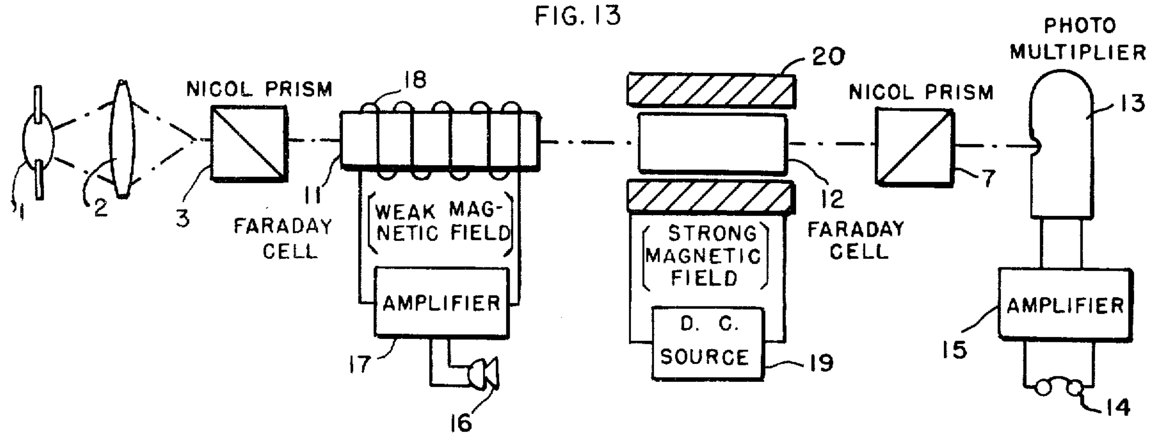

The various features and objects of the invention will be better understood from the following detailed description thereof when read in conjunction with the several figures of the accompanying drawing in which:

FIGS. 1 to 5, 7 to 12 and 17 show characteristic curves used in connection with an explanation of the principles involved and the operation of the component circuit elements in the systems of the invention;

FIGS. 6 and 13 show diagrammatically testing arrangements which were used by applicant to determine the effects on signal modulation and scrambling of signal modulation on polarized light waves obtainable with Faraday cells of a specific type when subjected to magnetic fields of different strengths, in accordance with the invention; and FIGS. 14, 15, 16 and 18 are schematic diagrams of different embodiments os secret communication systems or modification of portions of these systems embodying the invention.

FIG. 1 shows in the solid line the familiar anomalous dispersion curve, i.e., variation of refractive index N with wavelength V, found in a Faraday substance having an atomic resonance spectrum, as displayed, for example, in a monatomic gas such as sodium vapor under suitable low pressure; and in the dash line the corresponding variation of the absorption $k$ with wavelength in such a substance. Whether the maxima and minima of the dispersion curves are very flat, or very steep and high, depends on the damping coefficient of the oscillations involved, and can be optimized, as was done by the applicant in his experiments with Faraday cells containing metal vapors at low pressures, by proper choice of experimental conditions.

Figure 2:
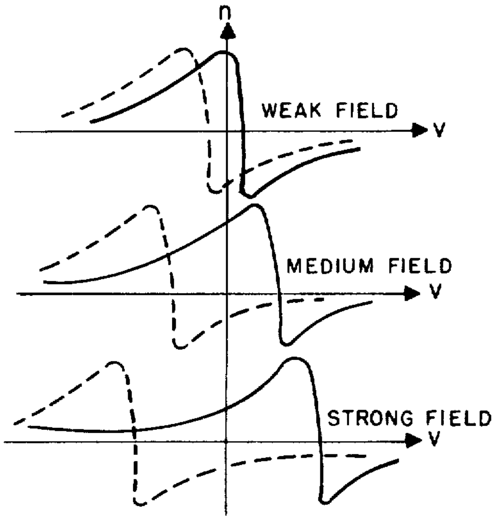

Now, the basic phenomenon that causes the Faraday effect in such a substance is the well known Zeeman splitting of the spectral lines in magnetic fields. Unpolarized light from a light source emitting most of its light as a single, sharp spectral line of a given wavelength, in the absence of a magnetic field applied to the light source, splits in a longitudinal magnetic field into two components of opposite circularly polarized light, the frequency splitting of the two Zeeman lines being given by the well known Larmor expression $$\Delta\omega = eH/2 \text{ megacycles} \qquad (2)$$

where $\omega$ is the angular rotation of the light wave used, $H$ is the magnetic field intensity in gauss and $e = 4.8\times10^{-10}$ electrostatic units ($epu$). Therefore, if a magnetic field is applied to such a substance, in each case two dispersion curves are obtained as shown by the curves of FIG. 2 for a weak, medium and strong applied magnetic field, respectively — one, shown in the solid line, for the right-hand circular Zeeman component and the other, shown in the dash-line, for the left-hand circular Zeeman component. The actual Faraday rotation may be computed from the following equation $$\omega p = (n_- - n_+)\ \omega p/2c \qquad (3)$$

where $n_-$ and $n_+$ are the respective values of refractive index of the left-hand and right-hand components, respectively, for every considered angular frequency $\omega$, $p$ is the light pass length in the Faraday cell and $c$ is the speed of light which is equal to $3(10^{10})$ centimeters per second. So, if the values of $n_-$ and $n_+$ from FIG. 2 are used to plot the Faraday rotation ($\phi/_H$) as a function of wavelength $V$, the curve shown in FIG. 3 (for a weak applied magnetic field) and the curve shown in FIG. 4 (for a strong applied magnetic field) are obtained. While the amount of Faraday rotation is practically independent of the wavelengths far away from a strong absorption line, a very strong anomalous dispersion is obtained within the frequency limits of the absorption line. In the case of optical spectral lines, the line width in the Faraday substance is extremely small, for example, in the case of the yellow sodium line, the line width is only one hundredth of an Angstrom ($10^{-10}$ centimeters).

Since, as explained above, the phenomenon of the anomalous dispersion of the Faraday effect takes place within a very small frequency interval, a spectroscope with an extremely high resolving power (say, at least $1 \times 10^7$) would be required to detect it. The new effect found by applicant, i.e., the conversion of linearly polarized light into completely unpolarized light when the Faraday cell is subjected to a sufficiently strong magnetiic field, is as conclusive evidence of the existence of this strong dispersion within the frequency limits of a strong absorption line as any direct observation with a super-resolving spectroscope, such as the hypothetical one referring to above.

Figure 5:
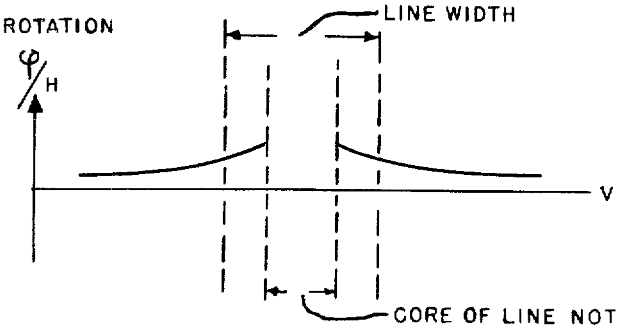

If the magnetic field applied to a Faraday cell of the monatomic gas type described is weak (say, of the order of some tenths of a gauss), the dispersion near the wings of a strong absorption line (the more centrally located portion of the line does not contribute to the Faraday effect since in this portion of the line the absorption is so strong that the gas in this spectral region is completely opaque) is very small, as indicated in FIG. 5. Therefore, the observed angle of Faraday rotation depends only very little on frequency; i.e., there is practically no dispersion noticeable.

FIG. 6 shows a schematic diagram of a standard Faraday effect testing arrangement used by applicant in his experiments. In this arrangement the light source 1 was a commercial sodium lamp. A beam of light from this lamp was focused by a lens system 2 on the first Nicol prism 3 which caused the light beam to be linearly polarized. The linear polarized beam was passed through a Faraday cell 4 of the sodium vapor type under test to which was applied a magnetic field from a d-c source 5 through the winding 6 surrounding the cell. The second Nicol prism 7 in the output of that cell served as a polarization analyzer. A photomultiplier 8 and associated meter 9 was used for measuring the amount of light transmitted through the analyzer prism 7, and for translating it into electrical power units.

Figure 7:
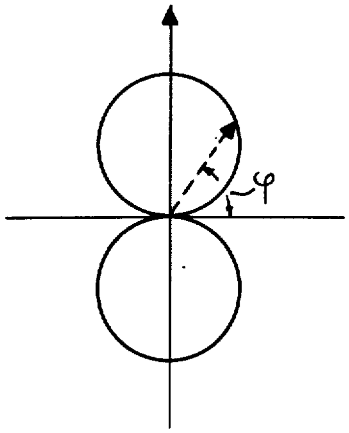

If $\phi$ is the rotational angle of the analyzing prism 7 with respect to the polarization plane of the first prism 3, then the transmitted light intensity is given by the relation $$I = I_o \sin^2 \phi \qquad (4)$$

as plotted in polar coordinates in FIG. 7 for the case where no magnetic field is applied to the Faraday cell.

Figure 8:
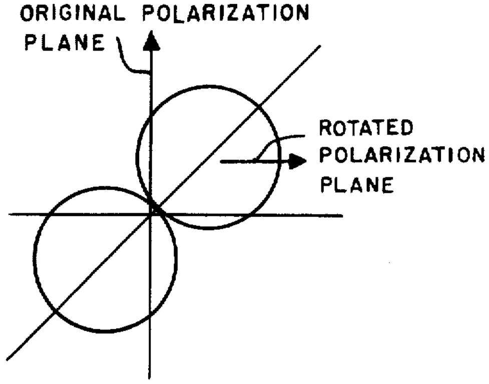
Figure 9:
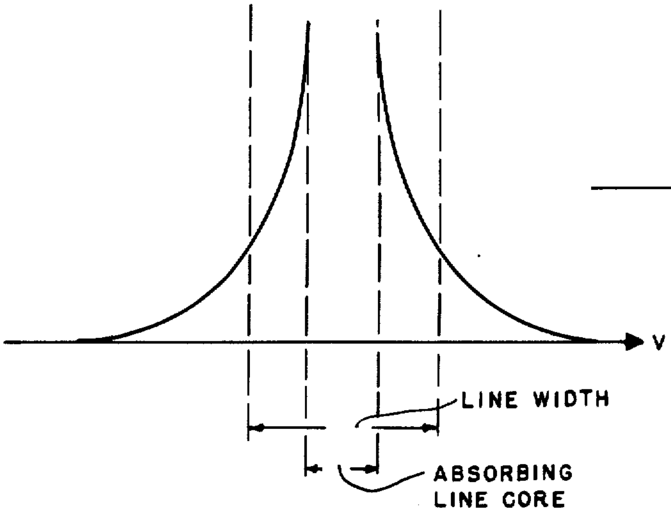
Figure 10:
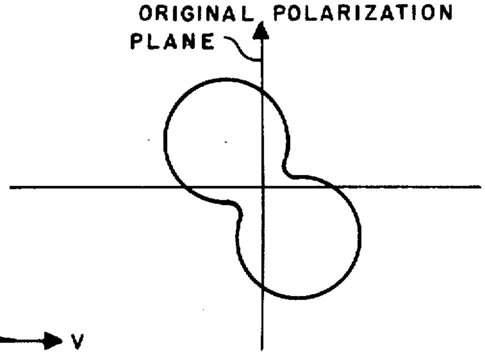
Figure 11:
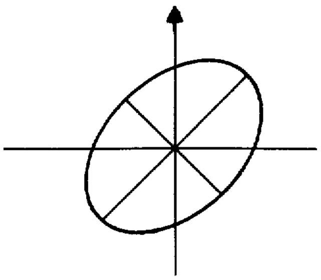
Figure 12:
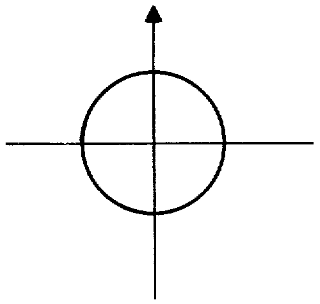

For the case of a weak magnetic field applied to the Faraday cell 4 from the DC source 5 through the coil 6 in the test circuit of FIG. 6, a nearly wavelength-independent small rotation of the polarization plane of the light beam is obtained, giving a relation between the transmitted light intensity and rotational angle $\phi$ of the analyzing prism 7 shown in polar coordinates in FIG. 8. If the applied magnetic field is made gradually stronger and stronger, the gradient of the Faraday dispersion in the wings of the spectral line of the Faraday substance becomes steeper and steeper, and the rotational angle of different wavelength values in the wings of this spectral line becomes slightly different as shown in FIG. 9. Therefore, it is no longer possible to cancel the transmitted light completely by rotating the analyzing Nicol prism 7 to a certain angle, and the transmitted light intensity as a function of the rotational angle of the prism now is as shown in FIG. 10. This effect increases the more the field strength is increased, and in a field of 50 gauss would appear as shown in FIG. 11, the difference between the minimum and the maximum transmitted light intensity being already quite small, in this case approximately 1 to 1.4.

With an even greater applied magnetic field, the respective Faraday rotation angles of each of the different frequencies contained in the wings of the spectral line differ so much from each other that their diverse directions are uniformly spread out over a full 360° angle (FIG. 12) and a rotation of the analyzing prism now results in no indication of even the slightest remaining polarization. This, as pointed out previously, for a sodium vapor filled Faraday cell is realized at approximately 150 gauss. The beam of light emerging from the Faraday cell subjected to such a strong magnetic field is substantially completely unpolarized and no optical manipulation whatsoever could reveal any information about its polarization status prior to entering the cell. Thus, any signal modulation (obtained by rotation of the original polarization plane) which the light beam might have had before entering the strong Faraday field would appear to an observer as completely wiped out. This was checked by using the testing arrangement shown in FIG. 13.

The testing arrangement of FIG. 13 included in addition to the sodium lamp light source 1, the lens system 2, the polarizer Nicol prism 3 and the analyzer Nicol prism 7 also used in the testing arrangement of FIG. 6, two Faraday cells 11 and 12 of the sodium vapor type previously described, spaced between the two prisms, and a signal detection circuit consisting of a photomultiplier 13 connected across the output of the analyzer prism 7 and a telephone receiver 14 connected across the output of the photomultiplier 13 through an amplifier 15. A weak speech modulating magnetic field, in the order of a few tenths of a gauss, was applied to the cell 11 by means of a microphone 16 connected through an amplifier 17 across a winding 18 having a suitable number of turns, suurrounding that cell, to variable rotate the plane of polarization of the linear polarized light beam transmitted through that cell in accordance with the amplitude of the speech signals impressed on the microphone. A strong magnetic field of approximately 200 gauss was applied to the cell 12 by means of a suitable d-c source 19 connected across the terminals of a suitable winding 20 surrounding that cell. This strong magnetic field operated to convert the modulated polarized light beam received in the cell 12 from the output of the cell 11 to a substantially completely unpolarized light beam. Even when the detecting device was adjusted to maximum sensitivity, no indication of any signals were noted in the telephone receiver 14, indicating that the modulation on the polarized light beam had been effectively wiped off when the beam was transmitted through the Faraday cell subjected to such a strong magnetic field.

As a result of this test, it occurred to applicant immediately that, since the Faraday dispersion, like any dispersion effect, is basically caused by phase delays, it should be possible to reverse this phenomenon completely by sending the unpolarized light beam so obtained in the output of the cell 12 through another similar Faraday cell subjected to the same very strong magnetic field but reversed in direction, to repolarize the light beam so as effectively to reproduce the original speech modulated polarized beam. A further experimental test showed that this was the case, and that restitution of the original polarization status of the light beam was obtained with high fidelity. The minimum magnetic field strength value at which this restitution of the original polarization status of the beam takes place is critical, and in applicant's experiments was comparable to the sharpness of tuning of a heterodyne receiver.

Figure 14:
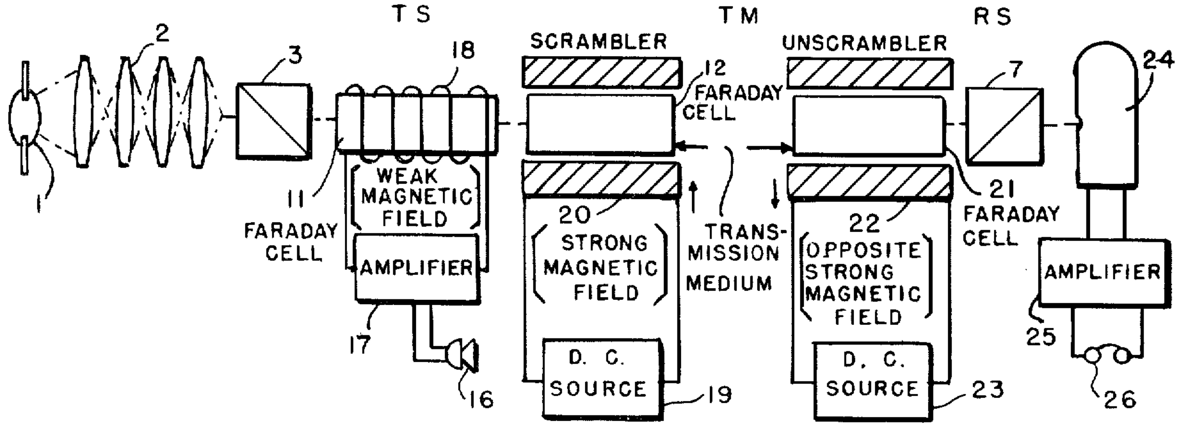

One embodiment of a secret speech optical transmission system utilizing the above-described newly discovered effects which was constructed to provide a high degree of secrecy in the speech signals during transmission over the system is shown in FIG. 14. This system comprises a signal transmitting station TS and a signal receiving station RS connected by a line or other signal transmission medium TM. The transmitting station TS includes elements similar to those employed in the testing system of FIG. 13 comprising in order, reading from left to right, a commercial sodium arc lamp used as the light source 1; a lens system 2 for collimating the light from that lamp into a parallel beam or bundle of light rays of the desired cross-dimension; a first Nicol prism 3 for linearly polarizing the resulting light beam; a Faraday cell 11 consisting of a suitable glass container of optimum length, say 12 centimeters, transparent to light rays in a predetermined direction, containing sodium vapor at an optimum low pressure, $2 \times 10^{-3}$ millimeters, through which the linearly polarized light beam is transmitted in that predetermined direction; means to apply a weak speech modulating magnetic field to the cell 11, comprising a suitable winding 18 surrounding that cell and a microphone 16 connected across the terminals of that winding through an amplifier 17, for causing the linear polarized light beam in transmission through the cell 11 by variable rotation of its plane of polarization to be modulated in accordance with the amplitude of the speech signals applied to the microphone 16; a second sodium vapor-filled Faraday cell 12 identical with the cell 11, transmitting the resulting signal-modulated light beam in its longitudinal direction, to which a very strong magnetic field (which can be of any arbitrarily chosen value provided it is as strong as 150 gauss) is applied by means of a suitable d-c voltage source 19 connected across a suitable winding 20 surrounding that cell, the combination of the cell 12 and its applied strong magnetic field operating as a "scrambler" device to convert the applied speech-modulated polarized light beam into a substantially completely unpolarized light beam so as to render the speech modulation thereon initially represented by rotation of its plane of polarization, secret before the light beam is transmitted over the transmission medium TM.

The receiving station RS of the system of FIG. 14 comprises in order, reading from left to right, a third sodium vapor Faraday cell 21, identical with the cells 11 and 12 at the transmitting station TS, to which is applied through a suitable winding 22 surrounding the cell 21 from a suitable d-c voltage source 23 connected across the terminals of that winding, a very strong magnetic field which is of the same magnitude as the strong magnetic field applied to the "scrambler" Faraday cell 12 at the transmitting station TS, but in the opposite direction, the combination of the cell 21, and its applied strong magnetic field operating as an "unscrambler" device to repolarize the unpolarized light beam received over the transmission medium TM in transmission therethrough and to reproduce therefrom the original speech-modulated polarized light beam; a second Nicol prism 7 operating as a polarization analyzer to convert in the customary way the phase modulation in the reproduced light beam, represented by the Faraday rotation effects in its plane of polarization, into a corresponding final amplitude modulation; a photomultiplier or photocell amplifier 24, 25 for detecting and amplifying this amplitude-modulated wave; and a telephone receiver 26 for audibly reproducing the original speech sounds of the transmitted message.

Preliminary tests of the embodiment of FIG. 14 indicated that it provided very substantial secrecy in the transmission of speech or other intelligible signals modulated on a light beam carrier wave. However, as a really effective secrecy system should have not just one, but at least two or three independently-chooseable parameters so that the possibility of an eavesdropper finding the right combination by trial and error to unscramble the transmitted secret message is greatly reduced, applicant has developed modifications of the optical secrecy system of FIG. 14 which meet these requirements, which are illustrated in FIGS. 15 and 16.

Figure 15:
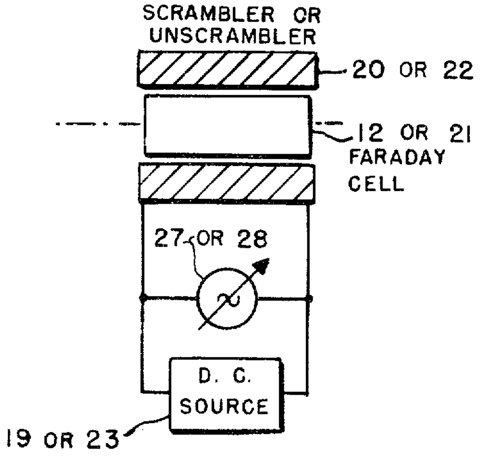

As indicated in FIG. 15, in the secrecy system of FIG. 14 a sinusoidal alternating current source 27 of adjustable frequency, say of 60 cycles per second, and of adjustable amplitude and phase is connected across the winding 20 in the "scrambler" device to superimpose on the d-c current in that winding due to the d-c source 19 an alternating current of that frequency and any desired amplitude or phase, and a sinusoidal alternating current source of the same frequency, amplitude and phase is connected across the winding 22 of the unscrambler device. This expedient provides additional parameters which render the system extremely secret in that an eavesdropper would have to match the intensity of the d-c current and the amplitude of the superimposed a-c current independently of each other to unscramble the signals, which would be practically impossible within the limited time in which the signals are being transmitted. A third independent parameter for the scrambling operation is the frequency of the superimposed a-c current, which within a practically unlimited range can be chosen at will.

Figure 16:
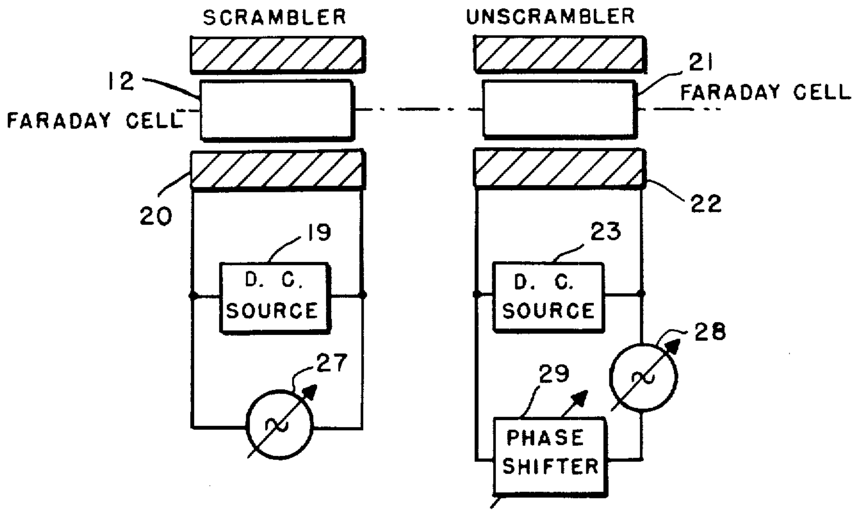

An expedient for producing a fourth independent parameter is illustrated in FIG. 16. This is obtained by inserting into either one of the two alternating current superimposing circuits, for example, in the circuit associated with the unscrambler device, as shown, a suitable adjustable phase shifting device 29 (which may be a condenser plus a resistor of adjustable value) to shift the relative phase relations between the a-c currents in the scrambler and unscrambler circuits respectively supplied thereto by the sources 27 and 28. Experiments have indicated that this relative phase relation is very critical in preserving secrecy. The number of independently chooseable parameters for the scrambling can be further increased easily, but it is believed that this is not necessary as the four independent chooseable parameters in the optical speech secrecy system described above would be sufficient for any practical use.

In applicant's experiments to develop a suitable optical secrecy system using Faraday cells of the general type described above, the yellow sodium resonance radiation (D = 5895.9 A and D = 5889.9 A), was used for illuminating the Faraday cells, mainly for the following reasons: (1) all the necessary optical adjustments can be made very easily and visually; (2) intensive sodium vapor lamps are commercially available; and (3) standard visible light photomultipliers can be used for the detection of the visible light. On the other hand, sodium has two disadvantages, namely, (1) to get the necessary optimum sodium vapor pressure of approximately $2 \times 10^{-3}$ millimeters, the Faraday cells have to be heated to a temperature of 250° centigrade; and (2) sodium vapor tends to attack most commercially available glass used for vapor containers rather heavily by turning the glass dark brown so that it eventually becomes opaque. It was found that the proper pressure of the sodium vapor could be obtained easily by using suitable heating coils around the cells to provide the proper temperature. The disadvantage as regards the effect of the sodium vapor on the glass cells can be obviated by the use of the now commercially available sodium resistant glass for the vapor containers in these cells.

Although the new speech secrecy principle discussed above works well in the visible range of the spectrum and can be used to advantage in the ultraviolet and near infrared region, the principle itself is of a very general nature and should basically work in any region of the electromagnetic spectrum including the microwave region, if suitable substances having strong and sharp absorption lines in that region are available. The necessary requirements are easily fulfilled for optical radiation because (1) the optical transitions are electric dipole transitions and therefore very strong; (2) the absorption is, therefore, even at very low density of the used substance, very high, and the damping coefficient which determines the line width and the magnitude of the Faraday effect can be made extremely large by working at sufficiently low gas pressure. In the microwave regions these conditions are not present.

Figure 3:
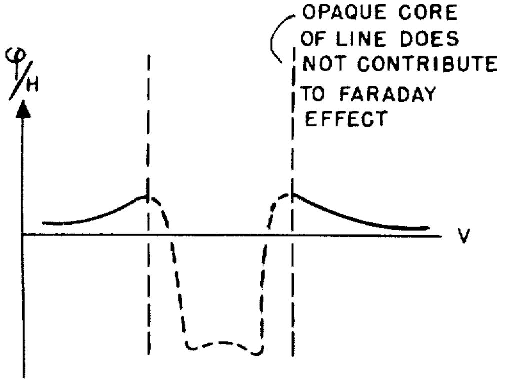
Figure 4:
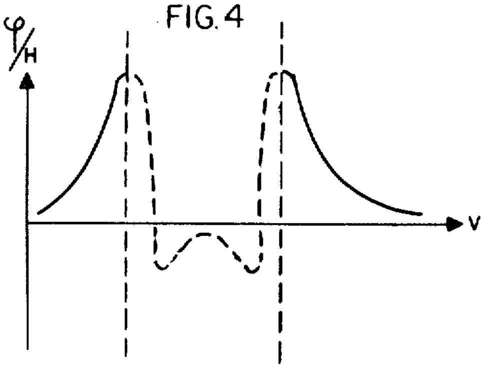
Figure 17:
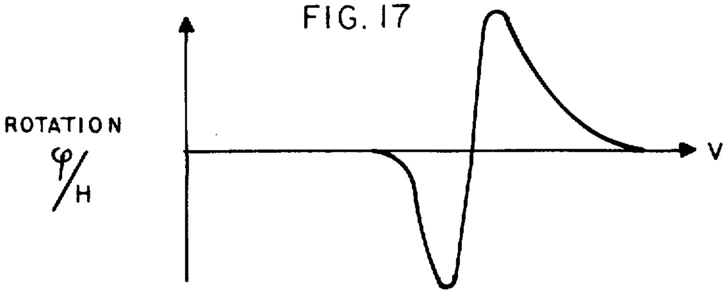

The optical Faraday effect is the so-called diamagnetic Faraday effect. It is a direct consequence of the splitting of spectral lines in magnetic fields and is displayed by all substances, regardless of whether they are diamagnetic or paramagnetic. This diamagnetic effect is temperature-independent, and its anomalous dispersion within or near a strong resonance absorption line shows a symmetrical behavior, as shown in FIGS. 3 and 4. In addition to this general Faraday effect of the diamagnetic type, in the case of paramagnetic substances another effect that also causes a rotation of the polarization plane, the so-called paramagnetic Faraday effect, is found, this effect being caused by the partial alignment of the natural permanent magnet dipoles of the paramagnetic substance in the applied magnetic field and, therefore, is temperature dependent. The paramagnetic effect also has anomalous dispersion within and near absorption lines; however, the dispersion pattern in this case is not symmetrical like in the case of the diamagnetic effect, but is unsymmetrical, as shown in the curve of FIG. 17. Since at optimal frequencies, the diamagnetic Faraday effect is (under proper chosen conditions) very high at small densities of the usual Faraday substances, while the paramagnetic effect at these low densities is very small, it is rather difficult to detect the paramagnetic effect in the optical region. In the microwave region, however, the diamagnetic effect is too small to be observed and, if a substance of sufficiently high density is used, the paramagnetic effect shows up.

The applicability of the newly discovered scrambling and unscrambling methods of the invention for producing secrecy in the transmission of speech or other signals discussed above for optical radiation, to a signal transmission system operating in the microwave region depends on the availability of substances that display sufficiently strong and narrow absorption lines, the width of which are comparable to the frequency bandwidth of microwave transmitters of customarily used Q-values. If such substances can be found there is no doubt that the method will work with as much efficiency in the microwave region as it does in the optical part of the spectrum. Since the Q-value which must be dealt with in practical microwave application is, in general, of the order of some thousands, this means that line widths of some few hundred kilocycles at most would be needed. In other words, the ratio of the microwave frequency used to the line width needed is approximately $10^4$. In the case of the optical experiments, the ratio of the light wave frequency to line width is about $6 \times 10^5$.

That satisfactory substances are available for use in the microwave region is evidenced by the work of other research workers to be briefly discussed below.

Independently of each other, three groups of research workers, namely, Huchinson and Pastor of the University of Chicago, Garstens and Ryan of the Naval Research Laboratory in Washington, and Levinthal, Rogers and Ogg of Stanford University, have found that certain substances, even in the liquid state, display extremely sharp microwave abssorption lines. Hutchinson and Pastor (Phys. Rev. 81, 382, 1951) used a 0.7 molar solution of metallic potassium in liquid ammonia and obtained, when this substance was exposed to a 23,700 mc microwave frequency, while at the same time being subjected to strong magnetic fields, an extremely sharp microwave absorption line due to the spin resonance of the quasi-free electrons originating from the ionization of the potassium atoms when they dissolved in the liquid ammonia. In fact, the line width at 23,700 mc was of the order of only 0.3 mc, which brings the above-mentioned ratio of frequency to line width up to a value of $10^5$, which is of the same order as that present in the optical wave.

The findings of Hutchinson and Pastor were confirmed at lower frequencies by Garstens and Ryan (Phys. Rev. 81, 888, 1951) and by Levinthal, Rogers and Ogg (Phys. Rev. 83, 182–183, 1951). As stated by these authors, the insertion of even a very small amount of such an alkali metal-ammonia solution into a microwave system causes heavy microwave losses. However, these heavy microwave losses, which apparently prevent the use of any sufficiently reasonable thickness of the solution in a waveguide to obtain more than a very weak Faraday effect, have actually, as will be shown, nothing to do with the damping due to the spin resonance of the so-called free electrons in the solution and it seems possible to avoid them by proper means. Nearly fifty years ago Kraus (see collective report of Kraus in Journal Franklin Institute, 212,537, 1931), had found that alkali metals like sodium, potassium, lithium, etc., dissolve easily in liquid ammonia and that the resulting solutions display a high electric conductivity. Other investigators found later that these alkali metal-ammonia solutions have also a quite noticeable paramagnetism. The alkali metal atoms, when they dissolve in the ammonia, are ionized and form a group of diamagnetic alkali ions (with a closed rare gas-like electron shell) and of free electrons, which due to their spin cause the mentioned paramagnetism. By proper choice of the intensity of the magnetic field applied to such a solution, the sharp microwave resonance line therein can be brought in to every desired frequency range. As can be seen from the extreme sharpness of the observed microwave line in such a solution, and as can be deduced theoretically from a rough calculation of the Einstein transition frequency, the heavy losses encountered are solely caused by skin losses due to the high electric conductivity of the alkali-ammonia solution. As is well known, such skin effect losses can be prevented by bringing the conductive material into a state of very fine grains (the diameter of which is small compared to the skin depth at the used frequency) and then making an emulsion of these small grains in a highly-insulating, lossless substance, for example, wax or paraffin. Since the electric conductivity of the mentioned alkali metal-ammonia solution is about 400 times smaller than the conductivity of metals, the skin depth at a frequency of $3 \times 10^9$ cps would be approximately $10^{-2}$ centimeters, and it shoud not be too difficult to make small particles of at least 10 times smaller diameter by grinding a solid frozen piece of the solution, and to suspend the small particles so obtained in paraffin or wax.

Also, the research workers, Holden, Kittel, Merritt and Yager (Phys. Rev. 77 147–48, 1950) have discovered that several organic substances with free radical groups display unusually sharp microwave resonance lines (due to the spin of the unsaturated uneven valency electrons in the free radical group). It is believed that concentrated research on this problem would reveal any number of other substances displaying a sufficiently high microwave Faraday effect due to sharp absorption lines in their spectra, which could be used in a secret microwave signal transmission system utilizing the methods of the invention.

Figure 18:
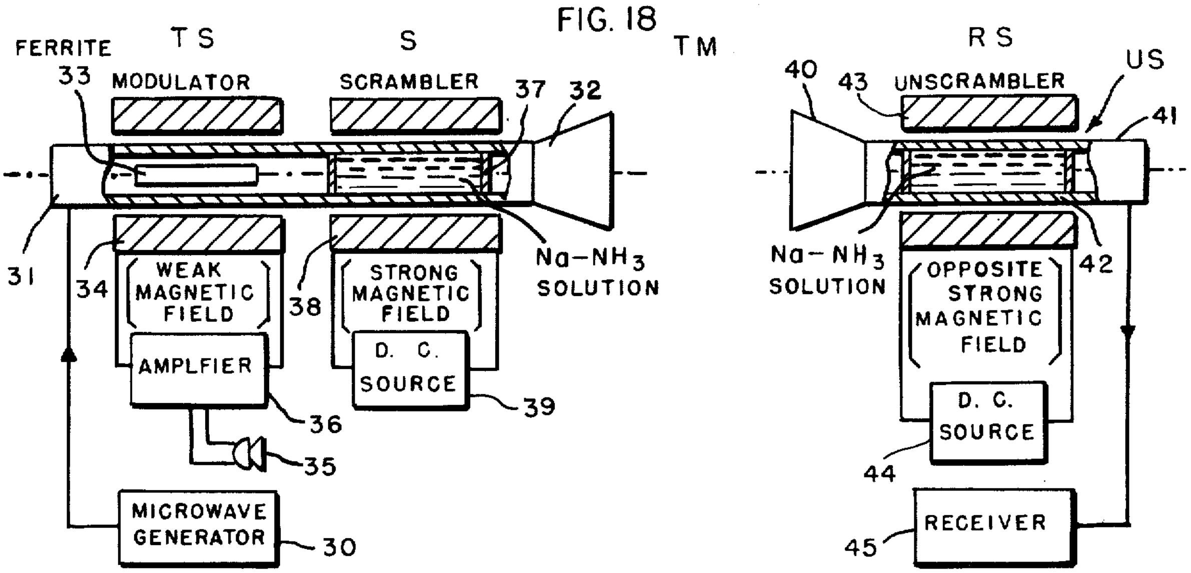

FIG. 18 shows one embodiment of a proposed microwave signal transmission system utilizing the methods of the invention for providing a high degree of secrecy in the speech or other signals transmitted thereover as modulations on a carrier microwave. As in the optical system of FIG. 14, this system includes a transmitting station TS and a receiving station RS connected by a wave transmission medium TM which for the particular case illustrated is an air transmission link. The transmitting station TS includes any suitable means represented by the box 30 for generating the microwave energy to be used as the carrier wave in the proposed system. The microwave energy from the source 30 at the transmitting station may be impressed on the input of a short section 31 of waveguide, which may be of rectangular or circular cross-section, terminating in a conventional horn 32, in a manner well known in the art so that it is propagated longitudinally over that section in the proper mode, say the $TE_{10}$ or $TE_{11}$ mode, respectively, towards the horn 32.

At a point/near the input of the waveguide section there is provided means for modulating the transmitted microwave energy with the signals, for example, speech signals, to be transmitted with secrecy over the system. For this purpose a standard device operating in a manner analogous to a Faraday cell is used. This device comprises a block 33 of compressed, finely divided particles of a material, commonly referred to as ferrite, which is known to have the property of rotating microwave energy transmitted through it when it is subjected to a magnetic field. The block 33 as shown is positioned within the waveguide section 31 at a point equidistant from its side walls, so the microwave is transmitted through it along its longitudinal axis. A magnetic field is applied by a magnetic coil 34 surrounding the portion of the waveguide section in which the ferrite block is located. A microphone 35 serving as a source of speech signals is connected through amplifier 36 across the terminals of the coil 34. The coil 34 is selected such as to apply a very weak speech modulating field, of the order of a few tenths of a gauss, to the "Ferrite" device 33, when it is supplied with speech signals from the microphone 35. The variable rotation produced in the microwave energy during its transmission through the device 33, which is proportional to the amplitude of the applied speech signals, represents the speech modulation on that wave.

A scrambler device S is associated with the waveguide section 31 at a point near the waveguide horn 32. This scrambler device includes a suitable container 37, which may be of glass or other suitable material adapted to transmit the microwave, and is disposed longitudinally within the guide 31. The container 37 should contain a sufficiently thick layer of a solution of finely divided particles of an alkali metal, such as sodium (Na), in ammonia ($NH_3$). As previously pointed out, in order to bring the sodium particles into a sufficiently fine form so as to minimize skin losses, the material used in the container 37 may be prepared by freezing a solid piece of the sodium-ammonia solution, grinding the frozen piece to bring the sodium particle to the desired fineness and suspending the ground particles so obtained in a carrier such as wax or paraffin. The scrambler device S also includes a heavy magnet coil 38 surrounding the portion of the waveguide section 31 in which the container 37 is inserted which in association with a suitable d-c source 39 connected across its terminals is selected such as to provide the very strong magnetic field of approximately 2000 gauss applied to the material in the container 37 needed for the scrambling operation. The effect of the scrambling device S on the microwave during its transmission through the container 37 and the sodium-ammonia solution contained therein, as pointed out above, would be to effectively remove all rotation effects representing the speech modulation therefrom. The resulting microwave is radiated into space (transmission medium TM) by the horn 32.

The receiving station RS at the receiving end of the transmission medium TM includes a waveguide receiving horn 40 for picking up the microwave energy received over that medium, feeding into a short section 41 of waveguide, similar to the waveguide section 31 at the transmitting station. An unscrambler device US is associated with the waveguide section 41. This unscrambler device US is similar to the scrambler device S used at the transmitting station TS, comprising a suitable container 42 disposed longitudinally within the waveguide section 41, containing a solution of finely divided particles of an alkali metal, such as sodium, in liquid ammonia, and means for applying a strong magnetic field of approximately 2000 gauss to the sodium-ammonia solution within the container 42, comprising a heavy magnetic coil 43 surrounding the portion of the waveguide section 41 in which the container 42 is inserted and a suitable d-c source 44 connected across the terminals of that coil. However, the d-c source 44 is so poled with respect to the coil 43 that the magnetic field applied to the sodium-ammonia solution within the container 42 although of the same magnitude as the magnetic field applied to the sodium-ammonia solution within the container 37 of the scrambler device 8 at the transmitting station TS, is in the opposite direction to that field. The effect of the unscrambler device US on the microwave received over the medium TM from the receiving station and propagated along the waveguide section 41 is the opposite of that produced by the scrambler device S at the transmitting station, that is, it operates to re-insert the rotation effects representing speech modulation into that wave effectively removed by the scrambler device S at the transmitting station TS, thereby reproducing the original speech-modulated mocrowave as it appeared at the input to the scrambler device S at that station.

The reproduced speech-modulated microwave is supplied through any suitable means, such as a dipole probe in the waveguide section 41, to a suitable receiver 45 for demodulating the signals thereform and supplying them in suitable amplified form to telephone receiving apparatus.

As in the case of the speech secrecy system for optical communication illustrated in FIG. 14 and described above, the effect of the scrambler device at the transmitting station is to impart a high degree of secrecy in the transmission of the speech or other signals over the transmission medium between the transmitting and receiving station, such that an eavesdropper who does not know the value of the magnetic field strength used in the scrambler device at the transmitting station to hide the speech modulation would find it difficult within a limited time interval to decipher the transmitted message. As in the case of the secret optical transmission system, the degree of secrecy in the microwave system may be substantially increased by adding to the system of FIG. 18 two or three independently chooseable parameters by means similar to those described above and illustrated in FIGS. 15 and 16 for the optical secrecy system.

Various other modifications of the circuits illustrated in the drawings and described above which are within the spirit and scope of the invention will occur to persons skilled in the art.

What is claimed is:

1. A system for transmitting varying amplitude signals with a high degree of secrecy over a wave transmission medium, including a source of polarized electromagnetic waves of predetermined wavelength at the input to said medium, three transmission devices each adapted for transmitting electromagnetic waves in a given direction, and including a substance having a resonance spectrum with a strong, sharp absorption line therein including said predetermined wavelength within its frequency limits, and exhibiting strong anomalous dispersion in the immediate neighborhood of said line, a first and a second one of said devices being located at the input to said medium and the third being located at the output of said medium, means to apply an electromagnetic wave from said source to said first device in said given direction, means simultaneously to apply to said first device in the direction of wave propagation a weak magnetic field varying in accordance with the amplitude of the signals to be transmitted, in order to produce rotation effects in the applied wave proportional to the instantaneous signal amplitudes, representing signal modulation, means to apply the resulting modulated wave to the second of said devices in said given direction, means simultaneously to apply to said second device in the direction of wave propagation a strong magnetic field of such strength as effectively to cause the removal from the modulated wave in transmission through that device of the rotation effects representing signal modulation, and thus to render the signals carried by that wave secret to a high degree before the wave is transmitted over said medium, means at the output of said medium to apply the received wave to said third device in said given direction, means simultaneously to apply to said third device in the direction of wave propagation a strong magnetic field of the same strength as that applied to said second device but reversed in direction with respect thereto to reinsert effectively in the applied wave in transmission through said third device the rotation effects representing signal modulation removed by said second device, means to convert the rotation effects in the resulting wave into proportional amplitude modulation and means to detect the signals from the resulting amplitude modulated wave.

2. An optical system for transmitting varying amplitude signals with a high degree of secrecy over a wave transmission medium, comprising means to produce a linear polarized light beam of a predetermined wavelength, three Faraday cells each transparent to light in a given direction and including a substance having an atomic resonance spectrum with a strong, sharp absorption line including said predetermined wavelength within its frequency limits, and exhibiting strong anomalous dispersion in the immediate neighborhood of said line, two of said cells being connected in tandem in the input to said medium and the third of said cells being connected to the output of said medium, means to apply said linear polarized light beam to the first of said two cells in said given direction, means simultaneously to apply to said first cell in the direction of light propagation a weak magnetic field varying in accordance with the instantaneous amplitude of the signals to be transmitted so as to produce in that cell rotations of the plane of polarization of the applied polarized light beam in amounts proprotional to said signal amplitudes, representing signal modulation, means to apply the resulting modulated polarized light beam to the second of said two cells in said given direction, means simultaneously to apply to said second cell in the direction of light propagation a strong magnetic field of such strength as to convert the applied polarized light beam in said second cell into a substantially completely unpolarized beam in which the rotation effects representing signal modulation have been removed so as to render the transmitted signals secret to a high degree before the beam is transmitted over said medium, means at the output of said medium to apply the received converted light beam to said third cell in said given direction, means simultaneously to apply to said third cell a strong magnetic field of the same strength as that applied to said second cell but reversed in direction with respect thereto, to repolarize the light beam and insert therein the rotation effects representing signal modulation effetively removed by said second cell at the input to said medium, a polarization analyzer for converting the phase modulation represented by the rotation effects in the re-polarized beam into corresponding amplitude modulation and means to detect the signals from the resulting amplitude-modulated light beam.

3. The secret signal optical transmission system of claim 2, in which each of said Faraday cells comprises a glass container of a given length, containing a vapor of an alkaline metal at an optimum low pressure in the order of one-thousandth of a millimeter; and said means to produce a linear polarized light beam of said predetermined wavelength includes a high intensity discharge lamp containing the same alkaline metal vapor at approximately the same low pressure as used in each of said Faraday cells, a lens system for collimating the light from said lamp into a parallel beam of light rays and a Nicol prism polarizer for linearly polarizing said beam.

4. The secret signal optical transmission system of claim 2, in which each of said Faraday cells consists of a glass tube approximately 11 centimeters in length containing sodium vapor at an optimum pressure of about $2 \times 10^{-3}$ millimeters obtained by heating the cell to approximately 250° centigrade; said means for producing a linearly polarized light beam includes a sodium arc lamp used as a light source, a lens system for collimating the light from said lamp into a parallel beam of light rays and a Nicol prism for producing linear polarization of said beam; the weak signal modulating magnetic field applied to said one Faraday cell at the input to said medium is of the order of a few tenths of a gauss; and the magnitude of the strong magnetic field applied to said second Faraday cell at the input to said medium and to said third Faraday cell at the output of said medium is at least 150 gauss.

5. The secret signal optical transmission system of claim 2, in which the strong magnetic field applied to said second Faraday cell at the input to said medium to convert the signal-modulated polarized light beam transmitted through that cell to a substantially completely unpolarized light beam and the oppositely directed magnetic field of the same strength applied to said third Faraday cell at the output of said medium is a direct current magnetic field obtained by the provision of a suitably proportioned magnet coil respectively surrounding each of these cells, supplied with direct current from an individual voltage source of suitable value connected across the terminals of the coil in reverse manner for the two coils; and to increase the degree of secrecy in the transmitted signals an alternating current of the same frequency, amplitude and phase is superposed on the direct current produced in each of these coils by the applied direct current magnetic field, the selected amplitude of the superposed alternating current with respect to that of the direct current in each magnet coil providing one independently chooseable parameter and the selected frequency of the superposed alternating current providing a second independently chooseable parameter for the secret system.

6. The secret signal optical transmission system of claim 2, in which the strong magnetic field applied to said second Faraday cell at the input to said medium and the strong magnetic field of the same magnitude but in the opposite direction applied to said third Faraday cell at the output of said medium, is a direct current magnetic field obtained by the use of a suitably proportioned magnet coil surrounding the respective cells and an individual d-c voltage source of suitable value connected across the terminals of each coil; and to increase the degree of secrecy in the transmitted signals, an alternating current of the same adjustable frequency and amplitude is superposed on the direct current produced in the magnet coil surrounding each of said second and third Faraday cells by the applied direct current magnetic field, and an adjustable phase shifter is inserted in one of the two alternating current circuits so formed to provide an additional parameter for the secret system.

7. A secret microwave signal transmission system comprising a signal transmitting station and a signal receiving station connected by an air wave transmission medium; said transmitting station including means for generating a microwave of predetermined wavelength for use as a carrier wave, a source of varying signals to be transmitted over the system with secrecy, a straight section of elongated waveguide line for propagating the generated microwave in the direction of the longitudinal axis of that section towards said medium, two transmission devices connected in tandem in said line section in the path of the propagated microwave, each of said devices having an atomic resonance spectrum with a strong, sharp absorption line including said predetermined wavelength within its frequency limits, and exhibiting strong anomalous dispersion in the immediate neighborhood of said line, means controlled by said source of signals for applying to the first of said devices in said line section a weak magnetic field varying in accordance with the instantaneous amplitudes of said signals, said one device operating in response to the applied weak magnetic field, in a manner analogous to the operation of a Faraday cell on light waves, to rotate the microwave in variable amounts proportional to said instantaneous signal amplitudes, the resulting rotation effects in the microwave emerging from said one transmission device and entering the second transmission device in said line section representing signal modulation, means for applying to said second transmission device a sufficiently strong magnetic field to convert the signal-modulated microwave in transmission through that device into a wave in which the rotation effects representing signal modualtion have been effectively eliminated so as to render the transmitted signals relatively secret and means to impress the converted microwave on said medium for transmission thereover to said receiving station; and said receiving station including means for picking up the received converted microwave from said medium, a second elongated waveguide line section for propagating the received microwave longitudinally thereover, a third transmission device identical with said second transmission device at the transmitting station, inserted in said second line section in the path of the propagated microwave, means for applying to said third transmission device a strong magnetic field of the same magnitude as that applied to said second transmission device but opposite in direction thereto, said third device operating in response to the applied oppositely-directed strong magnetic field to re-insert in the microwave transmitted therethrough the rotation effects effectively eliminated from that wave by said second transmission device at the transmitting station, thereby restoring the signal modulation thereto and reproducing the signal-modulated microwave substantially as it appeared at the input to said second transmission device at the transmitting station, means to convert the signal phase modulation on the resulting wave into equivalent amplitude modulation and means to detect the signals from the resulting amplitude-modulated microwave.

8. The secret microwave signal transmission system of claim 7, in which said first transmission device used as a modulator at the transmitting station comprises a block of compressed, finely-divided ferrite crystals, centrally located within said one waveguide line section, the means for applying the weak signal modulating field to that device consists of a suitably proportioned magnet coil surrounding the portion of the waveguide line section adjacent to that device, connected to said source of signals; each of said second and said third devices used at the transmitting station and at the receiving station, respectively, comprises a container centrally located within the waveguide line section at that station containing a thick layer of a solution of finely-divided particles of an alkaline metal, such as sodium, in liguid ammonia; and the means for respectively applying the strong magnetic field to said second and said third device is an individual suitably proportioned magnet coil surrounding the portion of the waveguide line section adjacent the device, and an individual d-c voltage source of suitable valve connected across the terminals of each coil.

9. A secret signal transmission system comprising a signal transmitting station and a signal receiving station connected by a wave transmission medium, said signal transmitting station comprising means for generating an electromagnetic wave of predetermined wavelength for use as a carrier wave, a source of varying signals to be transmitted over the system as modulations of said electromagnetic carrier wave with secrecy, two transmission devices each adapted for transmitting said electromagnetic wave in a given direction, each of said devices including a substance having an atomic resonance spectrum with a strong, sharp absorption line including said predetermined wavelength within its frequency limits, and exhibiting strong anomalous dispersion in the immediate neighborhood of said line, means for applying the generated electromagnetic wave to one of said devices in said given direction, means for simultaneously applying to said one device a weak modulating magnetic field varying in accordance with the instantaneous amplitudes of the signals from said source, said one device operating in response to the applied weak magnetic field to signal modulate the applied electromagnetic wave in transmission therethrough by causing variable rotation of that wave in amounts proportional to said instantaneous signal amplitudes, means for applying the resulting signal-modulated electromagnetic wave to the second of said devices in said given direction, means for simultaneously applying to said second device a strong magnetic field, said second device being responsive to the applied strong magnetic field when its magnitude exceeds a given value to render the transmitted signals substantially secret, by converting the applied electromagnetic wave into a similar wave in which the rotation effects are effectively removed therefrom and means for impressing the resulting converted wave on said transmission medium for transmission thereover to said receiving station; and said signal receiving station includes means for receiving the converted electromagnetic wave from said medium, a third transmission device identical with said second transmission device at the transmitting station, supplied with the received converted wave in said given direction, means for applying simultaneously to said third device a strong magnetic field of the same magnitude as that applied to said second transmission device at said transmitting station but opposite in direction to that field, said third device being responsive to the applied strong magnetic field applied thereto to effectively remove its secrecy from the signal modulation on the converted electromagnetic wave in transmission through that device by effectively re-inserting the rotation effects therein removed by said second device at the transmitting station and thus reproducing the original signal-modulated electromagnetic wave substantially as it appeared at the input of said second device, means for converting the phase modulation represented by the rotation effects in the resulting wave into proportional amplitude modulation and means to detect the signals from the resulting amplitude-modulated wave.

10. A secret optical signal transmission system comprising a signal transmitting station and a signal receiving station connected by a wave transmission medium; said signal transmitting station including means for producing a linear polarized light beam of a predetermined wavelength for use as a carrier wave, a source of varying signals to be transmitted with secrecy over the system as modulations of said carrier wave, two Faraday cells each transparent to light in a given direction and containing a substance having an atomic resonance spectrum with a strong, sharp absorption line including said predetermined wavelength within its frequency limits, and exhibiting strong anomalous dispersion in the immediate neighborhood of said line, means for applying the linear polarized light beam to one of said cells in said given direction, means for simultaneously applying thereto a weak magnetic field in the direction of light propagation, varying in accordance with the instantaneous amplitudes of the signals from said source, said one device being responsive to the applied weak magnetic field to signal modulate the linear polarized light beam in transmission therethrough by producing variable rotations of its plane of polarization proportional to said instantaneous signal amplitudes, means for applying the resulting signal-modulated polarized light beam to the second of said cells in said given direction, means for simultaneously applying to said second cell a strong magnetic field in the direction of light propagation, said second cell being responsive to the applied strong magnetic field when its magnitude exceeds a predetermined value to effectively conceal the signal modulation on the polarized light beam by converting that beam into a substantially completely unpolarized light beam in which the rotation effects representing signal modulation have been effectively removed and means to impress the resulting substantially unpolarized light beam on said transmission medium for transmission thereover to said receiving station; and said receiving station includes means for receiving the converted unpolarized light beam, a third Faraday cell identical with said one and said second Faraday cells at the transmitting station, supplied with the received converted unpolarized light beam in said given direction, means for applying to said third Faraday cell a strong magnetic field of the same magnitude as that applied to said second cell but in the opposite direction, said third cell being responsive to the applied strong magnetic field in said opposite direction to effectively restore the signal modulation to the light beam in transmission therethrough by effectively reinserting therein rotation effects substantially indentical with those effectively removed therefrom by said second cell and representing signal modulation and thus reproducing the signal-modulated polarized light beam substantially as it appeared at the input of said second device in said transmitting station, a polarization analyser for converting the phase modulation represented by the rotation effects in said reproduced light beam into equivalent amplitude modulation, and means to detect the signals from the resulting amplitude-modulated light beam.

* * * * *